(12) United States Patent
Hatano et al.

(10) Patent No.: US 6,602,816 B1
(45) Date of Patent: Aug. 5, 2003

(54) ACTIVATED CLAY PARTICLES HAVING SIMILAR SHAPES, METHOD FOR PRODUCTION THEREOF AND USE THEREOF

(75) Inventors: Masashi Hatano, Chuo-ku (JP); Hitoshi Yamamoto, Chuo-ku (JP); Daisuke Kuse, Chuo-ku (JP)

(73) Assignee: Mizusawa Industrial Chemicals Ltd, Tokyo (JP)

( * ) Notice: Subject to any disclaimer, the term of this patent is extended or adjusted under 35 U.S.C. 154(b) by 185 days.

(21) Appl. No.: 09/744,306

(22) PCT Filed: May 31, 2000

(86) PCT No.: PCT/JP00/03511
§ 371 (c)(1),
(2), (4) Date: Mar. 13, 2001

(87) PCT Pub. No.: WO00/73207
PCT Pub. Date: Dec. 7, 2000

(30) Foreign Application Priority Data

Jun. 1, 1999 (JP) ............................................. 11-154165

(51) Int. Cl.⁷ ................................................ B01J 21/16
(52) U.S. Cl. ............................. 502/81; 502/80; 502/83; 502/85; 502/87
(58) Field of Search .............................. 502/80, 81, 83, 502/85, 87

(56) References Cited

U.S. PATENT DOCUMENTS

| | | | | |
|---|---|---|---|---|
| 3,787,330 A | * | 1/1974 | Sugahara et al. | 502/72 |
| 4,717,699 A | * | 1/1988 | Mickelson | 502/83 |
| 4,919,818 A | * | 4/1990 | Alexander | 210/660 |
| 5,008,227 A | * | 4/1991 | Taylor et al. | 502/83 |
| 5,330,946 A | * | 7/1994 | Hynes et al. | 502/82 |
| 5,749,955 A | * | 5/1998 | Shaked et al. | 106/287.17 |
| 5,783,511 A | * | 7/1998 | Banin et al. | 501/146 |
| 5,917,069 A | * | 6/1999 | Buckl et al. | 554/193 |
| 6,093,669 A | * | 7/2000 | Banin et al. | 501/146 |
| 6,288,003 B1 | * | 9/2001 | Fabry et al. | 502/81 |
| 6,365,536 B1 | * | 4/2002 | Council et al. | 502/81 |

FOREIGN PATENT DOCUMENTS

| | | | |
|---|---|---|---|
| JP | 182331 | * | 3/1950 |
| JP | 9-299789 | * | 11/1997 |

OTHER PUBLICATIONS

Teiji Sato et al., "Ookuno Youto de Katsuyaku suru Kassei Hakudo," Japan Energy and Technology Intelligence, 1995, vol. 43 No. 11, pp. 67–69.*

* cited by examiner

Primary Examiner—Tom Dunn
Assistant Examiner—Christina Ildebrando
(74) Attorney, Agent, or Firm—Sherman & Shalloway (57) ABSTRACT

Activated regular-shaped clay particles forming macropores therein, preserving fine structure of the dioctahedral smectite clay minerals, and having particle diameters controlled to lie within a range in which they exhibit excellent filtering property. The invention further provides method of producing activated regular-shaped clay particles comprising the steps of adjusting the particle size of the dioctahedral smectite clay minerals to possess a volume-based median diameter ($D_{50}$) of from 1 to 10 μm as found by a laser diffraction method, mixing an acid-soluble or acid-decomposing inorganic compound to the milled product thereof, granulating the mixture into regular particles having a volume-based median diameter ($D_{50}$) of from 10 to 60 μm as found by a laser diffraction method, and treating the regular-shaped particles with an acid while maintaining the particle shapes.

36 Claims, 9 Drawing Sheets

2 θ (deg)

FIG.9

ACTIVATED CLAY PARTICLES HAVING SIMILAR SHAPES, METHOD FOR PRODUCTION THEREOF AND USE THEREOF

BACKGROUND ART

The present invention relates to regular-shaped particles of activated clay, to a method of producing the same and to use thereof. More particularly, the invention relates to regular-shaped clay particles of activated clay comprising an acid-treated product of a dioctahedral smectite having macropores in the particles, having excellent adsorbing property and filtering property in combination, and exhibiting excellent decolorizing performance and catalytic performance, to a method of producing the same and to use thereof.

It has been known from the old times that dioctahedral smectite clay minerals exhibit adsorbing property and decolorizing property. In Great Britain, these minerals have also been called fuller's earth or bleaching earth.

It has also been known from the old times to produce the so-called activated clay having increased specific surface areas by treating dioctahedral smectite clay minerals with an acid. For example, Japanese Examined Patent Publication (Kokoku) No. 335/1948 discloses a method of producing activated clay by kneading and molding acidic clay or a similar clay in water into a size of from 0.5 to 30 mm not to collapse, introducing resulting clay into an acid-resistant container, and heating and circulating an inorganic acid therein to activate the clay.

Japanese Examined Patent Publication (Kokoku) No. 2960/1957 discloses a method of producing granular activated clay by adding sulfuric acid to acidic clay to shape it and, then, drying until it can be milled, followed by milling, sieving to trap the particles of predetermined sizes and activating the particles in a customary manner.

Japanese Examined Patent Publication (Kokoku) No. 11209/1970 discloses a method of treating alumina silicate clay to produce activated clay or fine powdery silica by treating alumina silicate clay containing acid-soluble basic components with an acid, wherein the alumina silicate clay is added an acidic aqueous solution in an amount of not larger than the amount of an acidic aqueous solution with which clay particles in a dispersion starts precipitating, the clay particles being formed in the dispersion due to the addition of an acid, or an acid in an amount of from 1.0 to 1.5 equivalents with respect to the basic metal components that are to be removed, the basic metal components in the clay are reacted with the acid in the dispersion and, then, the reaction product is isolated from the dispersion solution, the particles of the reaction product are treated in an aqueous medium at a pH of not larger than 1, and the basic metal components are picked up from the product.

According to the conventional production of activated clay by the treatment with an acid, the treatment conditions are adjusted such as adjusting the acid concentration, temperature, treating time, etc. so that the acid-soluble basic components in the clay minerals are at least partly eluted to improve decolorizing performance and to increase the specific surface area.

Among the uses of activated clay, the use as a refining agent for oils and fats requires a strong property for adsorbing coloring matters such as chlorophyll and the like contained in fats or oils, as well as good filtering property for separating the refined fats and oils from the waste clay from the standpoint of production.

In the conventional activated clay, however, the property for adsorbing coloring matters is not compatible with the filtering property, and no clay has yet been known satisfying both of these properties to a sufficient degree.

That is, property for adsorbing coloring matters is improved as the particle diameter of the activated clay becomes more fine. On the other hand, the filtering property decreases to a conspicuous degree as the particle diameter becomes fine.

DISCLOSURE OF THE INVENTION

The present inventors have succeeded in producing regular-shaped particles of activated clay forming macropores therein, preserving fine structure of the dioctahedral smectite clay minerals, and having particle diameters controlled to lie within a range in which they exhibit excellent filtering property and have discovered the fact that the activated regular-shaped clay particles exhibit excellent adsorbing property and filtering property in combination.

The object of the present invention, therefore, is to provide activated regular-shaped clay particles obtained by treating a dioctaheral smectite with an acid, having macropores in the particles, having excellent adsorbing property and filtering property in combination, and exhibiting excellent decolorizing performance and catalytic performance, and a method of producing the same.

Another object of the present invention is to provide a method of easily and efficiently producing the activated regular-shaped clay particles having the above-mentioned properties without using any particular apparatus or means.

According to the present invention, there are provided activated regular-shaped clay particles obtained by treating dioctahedral smectite clay minerals with an acid, wherein the regular-shaped particles have a volume-based median diameter ($D_{50}$) of from 10 to 60 μm as found by a laser diffraction method, have a porous volume of porous radii of 1000 to 70,000 angstroms of from 0.63 to 1.00 cc/g as measured by a mercury intrusion porosity method, and have a BET specific surface area of from 250 to 400 m²/g.

It is desired that the activated regular-shaped clay particles have a circularity (A) defined by the following formula (1), $$A=\{\sqrt{(R_1 \times R_2)}\}/R_1 \tag{1}$$

wherein $R_1$ represents the radius of a circumscribed circle along the contour of a particle of a scanning-type electron microphotograph thereof, and $R_2$ represents the radius of an inscribed circle thereof, of from 0.8 to 1.0.

It is desired that the activated regular-shaped clay particles have a frill-like thin-piece texture specific to montmorillonite and crater-like porous texture in the scanning-type electron microphotograph thereof.

It is desired that the activated regular-shaped clay particles have a diffraction peak at 2θ=19 to 20 degrees specific to montmorillonite and a diffraction peak at 2θ=25 to 26 degrees specific to gypsum in the X-ray diffraction (Cu–Kα).

According to the present invention, there is further provided a method of producing activated regular-shaped clay particles comprising the steps of:

adjusting the particle size of the dioctahedral smectite clay minerals to possess a volume-based median diameter ($D_{50}$) of from 1 to 10 μm as found by a laser diffraction method;

mixing an acid-soluble or acid-decomposing inorganic compound to the milled product thereof;

granulating the mixture into regular-shaped particles having a volume-based median diameter ($D_{50}$) of from 10 to 60 μm as found by a laser diffraction method; and treating the regular-shaped particles with an acid while maintaining the particle shapes.

According to the method of production of the invention, it is desired that:

1. An acid-soluble or acid-decomposing inorganic compound is mixed to the milled product in an amount of from 1 to 15% by weight in terms of the dry product thereof;
2. the acid-decomposing inorganic compound is a calcium carbonate;
3. The mixture is granulated by subjecting a slurry of the mixture to a spray-dry granulation; and
4. The regular particles are treated with an acid by being immersed in an aqueous solution of a mineral acid maintained at 60 to 100° C.

According to the present invention, there is further provided a refining agent for fats or oils, comprising the above-mentioned activated clay.

According to the present invention, there is further provided a catalyst carrier comprising the above-mentioned activated clay.

BRIEF DESCRIPTION OF THE DRAWINGS

"A" to "J" in FIG. 9 represent the following parts.
A: Master gear
B: Pinion
C: Pulley for combining a motor
D: Rubber tube
E: Temperature meter
F: Glass stirrer rod
G: Testing tube
H: Oil bath
I: Stirrer for the oil bath
J: Electric heater

BEST MODE FOR CARRYING OUT THE INVENTION

The activated regular-shaped clay particles comprise clay obtained by treating dioctahedral smectite clay minerals with an acid, and have a feature in that the particles have a regular shape with a predetermined particle diameter containing macropores and have activated surfaces necessary for adsorbing coloring matters or the like.

Figure 1:
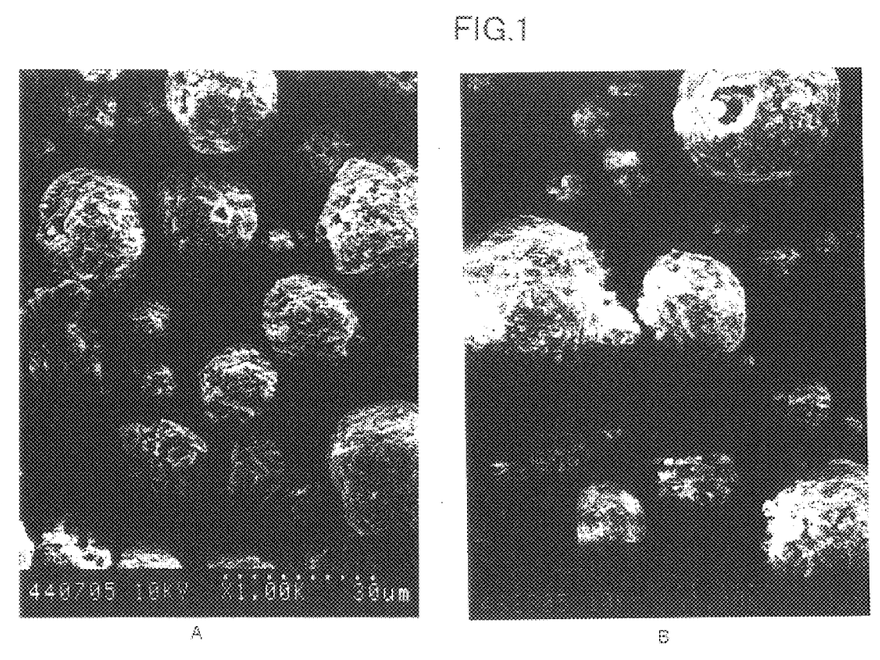
FIG. 1 shows scanning-type electron microphotographs of the structure of activated regular-shaped clay particles of the present invention (magnification of 1000 times in both FIGS. 1(A) and 1(B))
Figure 2:
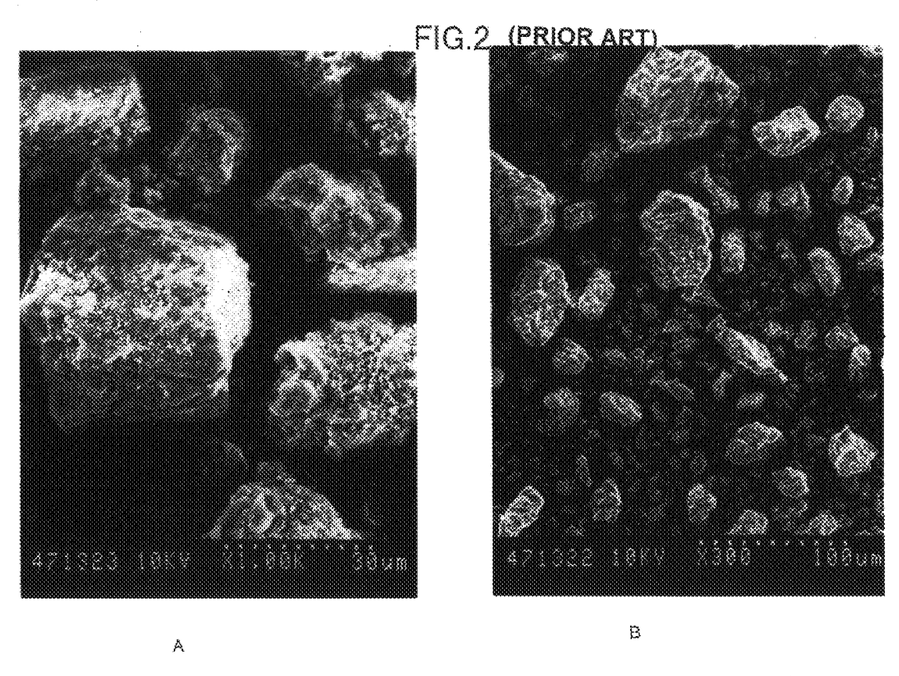
FIG. 2 shows scanning-type electron microphotographs of the structure of the conventional activated clay particles (magnifications of 1000 times in FIG. 2(A) and 300 times in FIG. 2(B))

The accompanying FIGS. 1(A) and 1(B) are scanning-type electron microphotographs showing the structures of the activated clay regular-shaped particles of the present invention, and FIGS. 2(A) and 2(B) are scanning-type electron microphotographs of the activated clay that has heretofore been used as a refining agent for fats and oils.

Comparison of the above photographs indicates that the conventional activated clay particles have irregular-shaped particle structures whereas the activated regular-shaped clay particles of the present invention have a spherical structure or a regular particle structure close to the spherical shape, and that the activated regular-shaped clay particles of the invention have a particle size distribution over a range which is considerably narrower than that of the conventional activated clay particles.

Owing to this regular particle structure, the activated clay particles of the invention exhibit excellent fluidity like an easily flowing powder, and can be very favorably handled as a powder.

Figure 4:
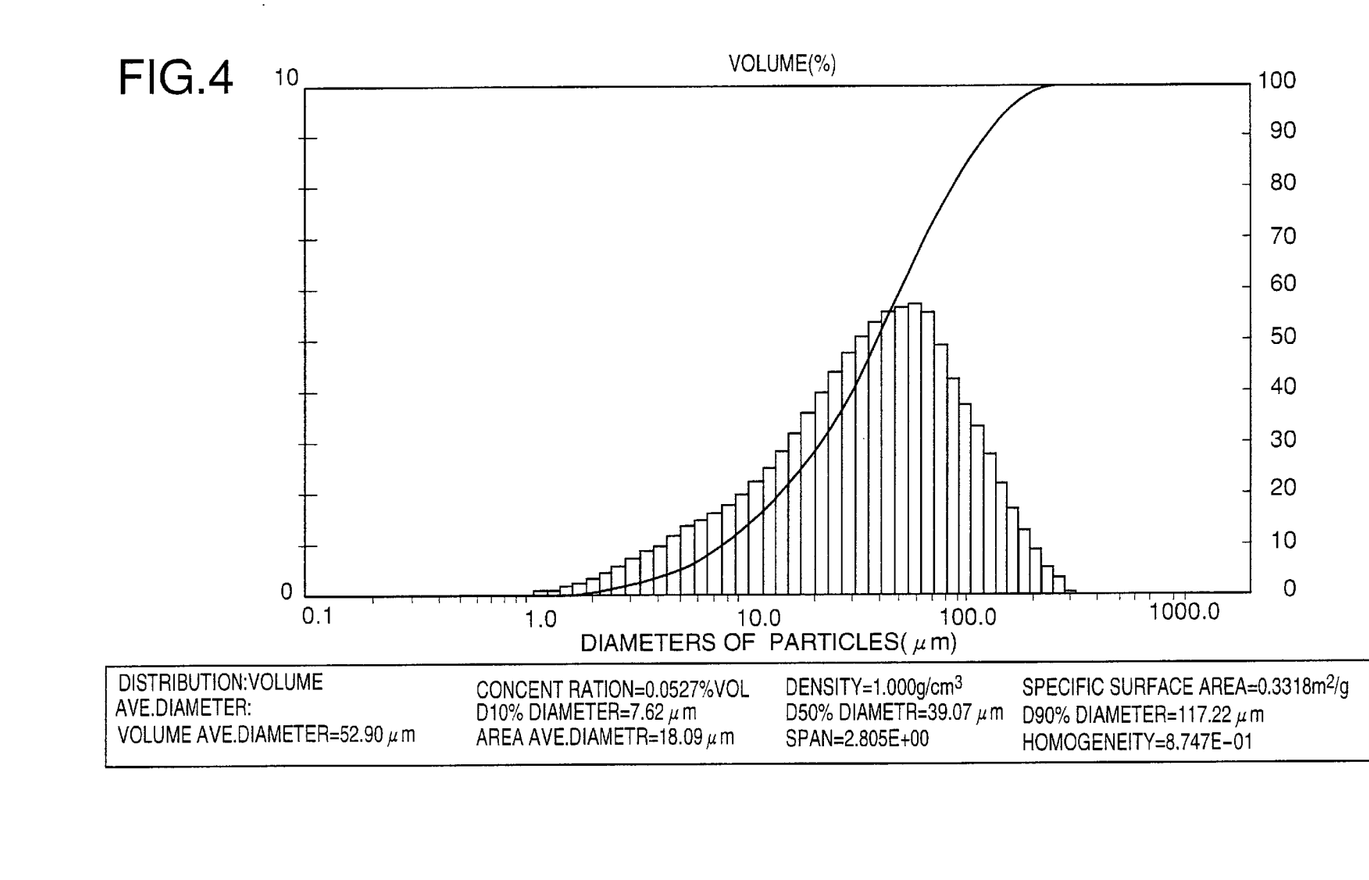
FIG. 4 shows a curve of particle size distribution of the activated regular-shaped clay particles of the present invention.

FIG. 4 is a diagram illustrating a distribution of particle sizes of the activated regular-shaped clay particles of the present invention based on the volume as found by a laser diffraction method. The activated regular-shaped clay particles of the invention has a median diameter ($D_{50}$) that lies within a relatively wide range of from 10 to 60 μm and, particularly, from 10 to 45 μm.

The activated clay particles having diameters lying within the above-mentioned range, exhibit very excellent filtering property and can be brought into homogeneous and uniform contact with the material that is to be treated.

Figure 5:
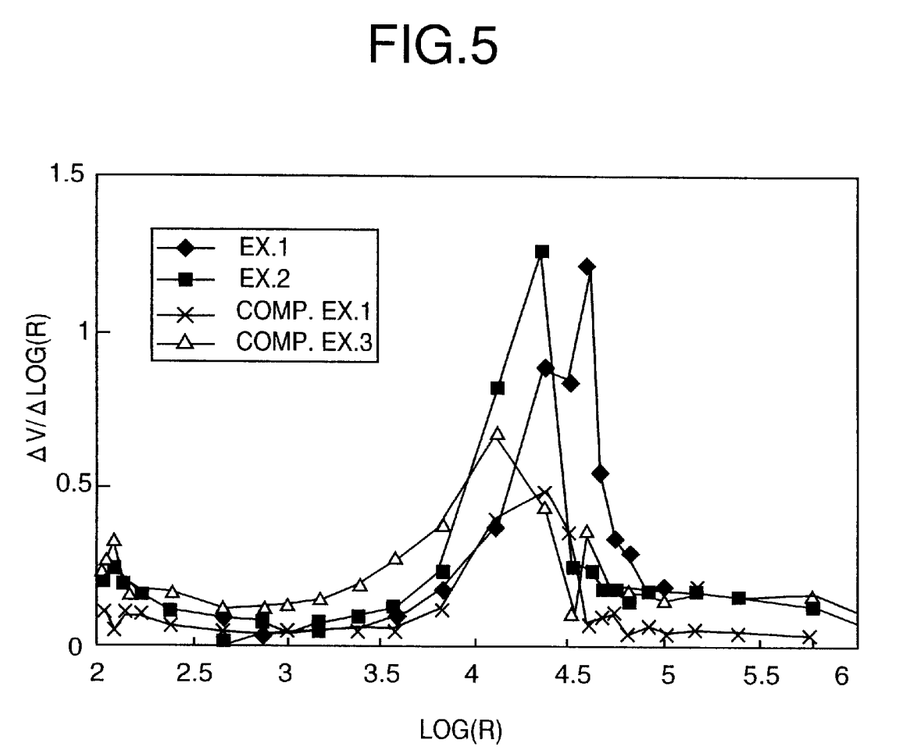
FIG. 5 shows a curve of fine pore distribution of the activated regular-shaped clay particles of the present invention.

FIG. 5 shows a curve of fine pore distribution of the activated regular-shaped clay particles of the present invention, and wherein the abscissa represents logarithmic values of radii of pore (angstroms), and the ordinate represents a change in the pore volume (cc/g)/a change in the logarithmic value of radius of pore (angstroms), i.e., represents a differentiated value.

From FIG. 5, it is obvious that the activated clay particles of the invention have a large peak of porous volume in a region of large porous radius and, particularly, in a region of porous radius of from 15000 to 50000 Å.

The activated clay particles of the present invention have a porous volume (PV) of porous radii of 1000 to 70,000 angstroms of from 0.63 to 1.00 cc/g as measured by a mercury intrusion porosity method, manifesting greatly increased macropores as compared to the porous volume (PV) of the conventional activated clay particles of 0.55 cc/g.

It is believed that due to this increased macropores, the activated clay particles of the invention diffuse at an increased rate into active adsorption sites of the material to be treated, accounting or an increased adsorption rate and adsorption amount.

When the porous volume (PV) is smaller than the above-mentioned range, the adsorption rate and the adsorption amount tend to decrease compared to when the porous volume lies within the above-mentioned range.

Despite of their increased particle diameter and increased macropores, the activated clay particles of the present invention have a BET specific surface area of from 250 to 400 m$^2$/g and, particularly, from 300 to 400 m$^2$/g, which is in no way inferior to that of the conventional activated clay particles.

When the specific surface area is smaller than the above range, the adsorption amount tends to become smaller than that of when the specific surface area lies within the above-mentioned range. When the specific surface area exceeds the above-mentioned range, on the other hand, the affinity to the material to be adsorbed decreases and, hence, the adsorption amount tends to decrease.

It was pointed out already that the activated regular-shaped clay particles of the present invention have a special particle structure or a regular particle structure close to the spherical shape. Besides, the activated regular-shaped clay particles of the invention have a circularity (A) defined by the following formula (1), $$A=\sqrt{(R_1 \times R_2)}/R_1 \quad (1)$$

wherein $R_1$ represents the radius of a circumscribed circle along the contour of a particle of a scanning-type electron microphotograph thereof, and $R_2$ represents the radius of an inscribed circle thereof, of from 0.8 to 1.0 and, particularly, from 0.85 to 1.0.

The circularity, too, is closely related to the filtering property and the handling of the powder. When the circularly is smaller than the above range, the filtering property decreases or the powder becomes less easy to be handled.

Figure 3:
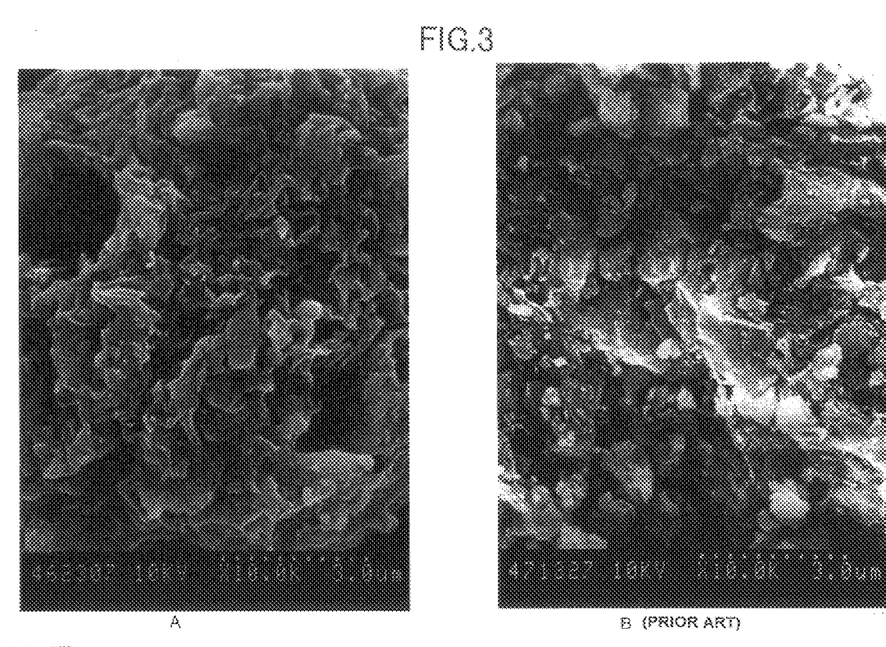
FIG. 3 shows a scanning-type electron microphotograph of the internal structure of activated regular-shaped clay particles of the present invention (FIG. 3(A)) and a scanning-type electron microphotograph of the internal structure of the conventional activated clay (FIG. 3(B)) (magnification of 1000 times in both FIGS. 3(A) and 3(13))

FIG. 3(A) is a scanning-type electron microphotograph showing fine structure of the activated regular-shaped clay particles according to the present invention, i.e., showing a very interesting internal structure. From the scanning-type electron microphotograph, it is obvious that the activated clay particles of the present invention have a frill-like thin-piece texture specific to montmorillonite and crater-like porous structure.

That is, montmorillonite has a structure of a collection of a large number of frill-like thin-piece textures (curved thin-piece textures). It is an astonishing fact that the structure of the montmorillonite is substantially remaining in the activated clay particles of the present invention.

In the conventional activated clay particles as shown in FIG. 3(B), the frill-like thin-piece texture is extinguishing due to milling. This texture, however, is remaining in the activated regular-shaped clay particles of the present invention to effectively act for adsorbing coloring matter and the like.

Further, the crater-like porous texture is formed in the particles serving as passages for the material to be treated and contributing to increasing the rate of diffusion into the adsorption sites.

Figure 6:
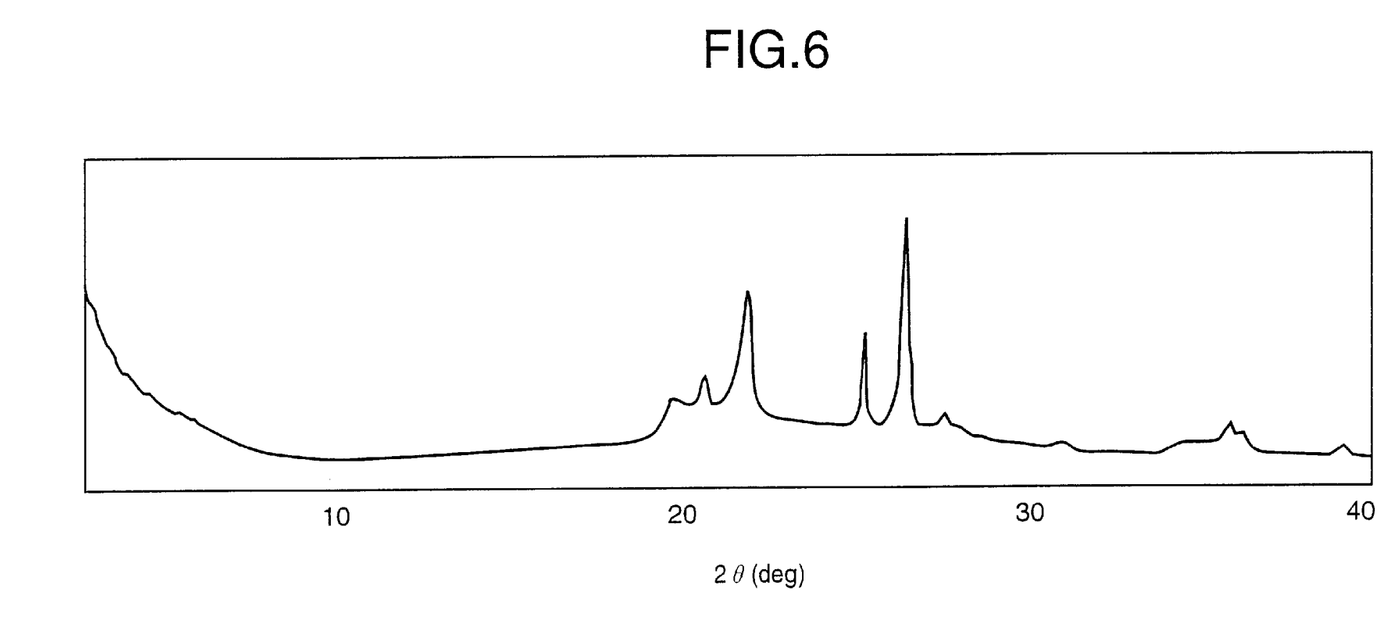
FIG. 6 is an X-ray diffraction image of the activated regular-shaped clay particles of the present invention.

FIG. 6 is an X-ray diffraction image of the activated regular-shaped clay particles according to the present invention. The x-ray diffraction image (cu-κα) proves that the particles exhibit a diffraction peak at 2θ=19 to 20 degrees specific to montmorillonite and a diffraction peak at 2θ=25 to 26 degrees specific to gypsum. The function of gypsum will be described later in relation to the method of production.

According to the present invention, the activated regular-shaped clay particles are produced through the steps of:

adjusting the particle size of the dioctahedral smectite clay minerals, a product thereof pretreated with an acid, or a product thereof treated with an alkali (hereinafter also simply called starting clays) to possess a volume-based median diameter ($D_{50}$) of from 1 to 10 μm as found by a laser diffraction method;

mixing an acid-soluble or acid-decomposing inorganic compound to the milled product thereof;

granulating the mixture into regular particles having a volume-based median diameter ($D_{50}$) of from 10 to 60 μm as found by a laser diffraction method; and treating the regular particles with an acid while maintaining the particle shapes.

According to the method of the present invention, the step of adjusting the particle size of the starting clays, the step of mixing the acid-soluble or acid-decomposing inorganic compound, and the step of granulating the mixture, are carried out prior to the step of treatment with the acid.

First, the step of adjusting the particle sizes of the starting clays is essential and indispensable for producing activated clay having large macropore volume and large specific surface area. When the particle size of the starting clays is larger than the above range, the porous volume and the specific surface area tend to decrease, and property for adsorbing coloring matter tend to be decreased, too.

To decrease the particle size of the starting clays to be smaller than the above range, however, an excess of burden is required for milling the starting clays, which is not desirable from the standpoint of economy. Besides, over-milling is not desirable from the standpoint of properties of the finally activated clay.

It is also important to mix the acid-soluble or acid-decomposing organic compound to the grain size-adjusted starting clays from the standpoint of increasing the macropores of the activated clay. Upon mixing the acid-soluble or acid-decomposing inorganic compound into the grains of the starting clays, it is believed that the inorganic compound is eluted or decomposed with an acid at the time when the grains are treated with an acid, enabling macropores to be formed.

Upon granulating the mixture of the grain size-adjusted starting clays and the acid-soluble or acid-decomposing inorganic compound into grains having the above-mentioned particle diameter, it is allowed to control the granular shape and grain diameter of the finally activated clay particles to lie within the above-mentioned ranges, making it possible to improve the filtering property and enabling the particles to come into homogeneous contact with the material to be treated.

In the present invention, the granules of the thus formed mixture are treated with an acid under a condition where the structure of the regular particles is maintained. Due to the treatment with an acid, the starting clays are activated, the acid-soluble or acid-decomposing inorganic compound elutes or is decomposed with the acid, and it is allowed to obtain activated regular clay particles having macropores formed in the particles, having excellent adsorbing property and filtering property in combination, and exhibiting excellent decolorizing performance and catalytic performance.

Starting Clay Minerals

The dioctahedral smectite has a laminated-layer structure in which basic layer units are laminated in the direction of c-axis, the basic layer unit being a three-layer structure in which an AlO$_6$ octahedral layer is sandwiched by two SiO$_4$ tetrahedral layers, Al in the AlO$_6$ octahedral layer is isomorphously replaced by Fe or Mg, and Si in the SiO$_4$ tetrahedral layers is isomorphously replaced by Al. Among the layers are existing metal cations in a form to compensate for the lack of electric charge caused by isomorphous replacement.

Figure 7:
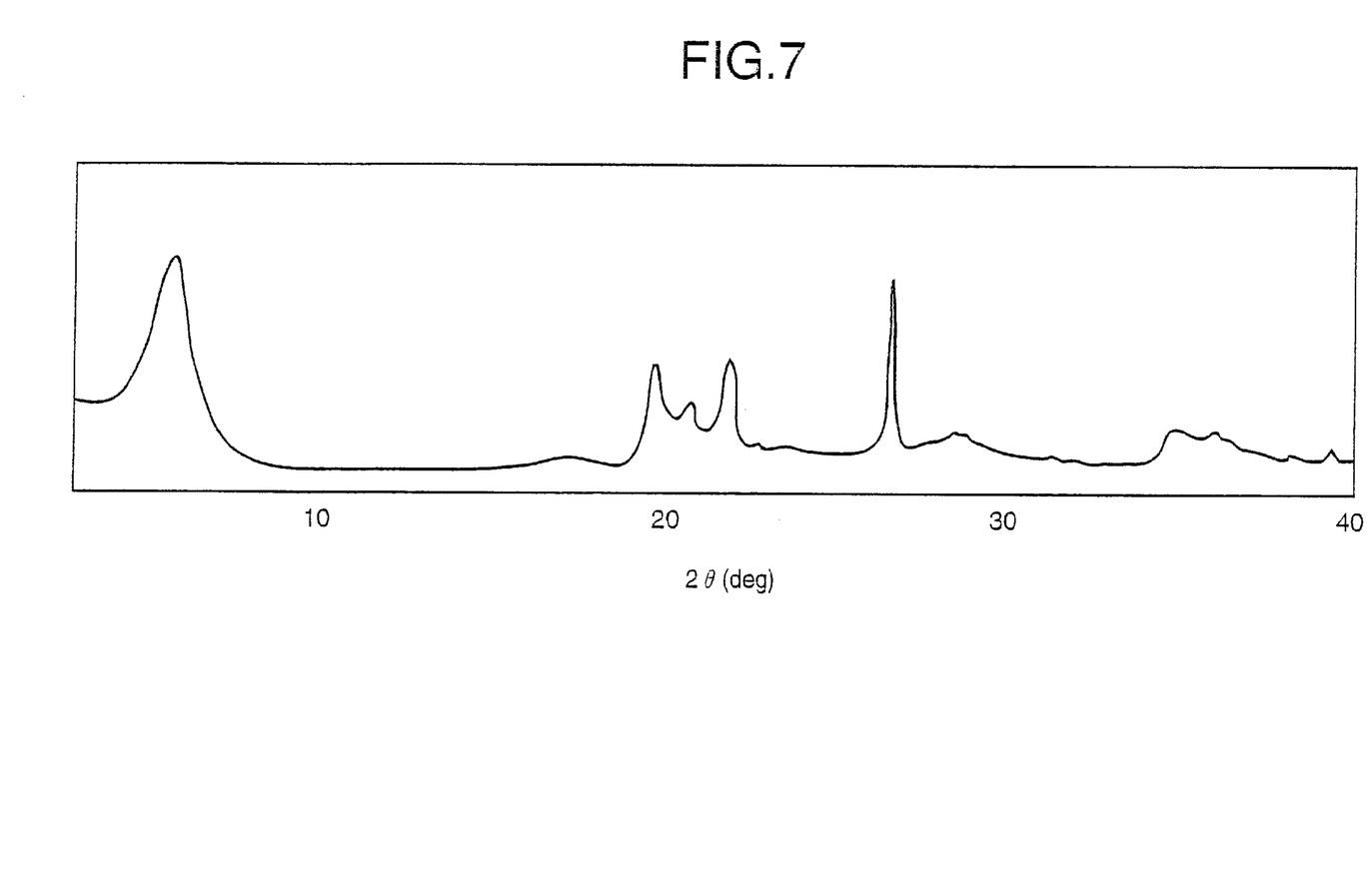
FIG. 7 is an X-ray diffraction image of the dioctahedral smectite clay minerals used as a starting material.

FIG. 7 is an X-ray diffraction image of the starting clays used for the production of activated clay of FIG. 6. FIGS. 6 and 7 indicate that the starting clays used for the invention and the activated clay produced therefrom exhibit a clear diffraction peak at an index (11) of a plane, proving the presence of a basic three-layer structure in the clays as well as the fact that the basic three-layer structure is remaining in the activated clay, too.

In the X-ray diffraction of crystals, it has been known that an intensity peak appears in the interference when the following Bragg's formula (2) is satisfied, $$n\lambda = 2d_{hkl} \sin \theta \quad (2)$$

where n is a degree, $\lambda$ is a wavelength of X-ray, $d_{hkl}$ is a spacing of (hkl) of a crystal, and $\theta$ is an angle of diffraction.

The base plane reflection peak (001) of a clay mineral is right-and-left symmetrical, but the reflection of (hkl) exhibits a peak lacking symmetry to a conspicuous degree. This is because, though the layers are overlapped in parallel, the positions of the layers are irregular relative to one another. Such an asymmetric peak is called two-dimensional reflection, and the index (1) does not assume a particular value. Therefore, the index is denoted by (hk). The index (11) of plane referred to in this specification stands for this meaning.

From the standpoint of classifying the clay minerals, the dioctahedral smectite clay minerals include montmorillonite, beidellite, nontronite and volkonskoite. Montmorillonite includes so-called acidic clay and bentonite.

It is considered that the dioctahedral smectite is formed as the volcanic ash or lava is metamorphosed being affected by sea water.

Described below is an example of a chemical composition of a representative starting clay mineral.

| | |
|---|---|
| $SiO_2$ | 64.4% by weight |
| $Al_2O_3$ | 16.3% by weight |
| $Fe_2O_3$ | 3.3% by weight |
| MgO | 6.5% by weight |
| CaO | 0.9% by weight |
| $K_2O$ | 0.5% by weight |
| $Na_2O$ | 1.4% by weight |
| ignition loss | 6.7% by weight |

The dioctahedral smectite clay mineral used as a starting material may often contain impurities such as stone sand, iron, opal CT, quartz, etc. To remove such impurities, a refining process is carried out, such as stone sand separation, floatation, magnetic separation or the like.

Prior to adjusting the particle size that will be described later, iron may be removed by the treatment with an acid to a slight degree or the impurities such as opal CT may be converted into a soluble silicic acid through the treatment with an alkali to a slight degree. The thus pretreated starting clay can be used for the method of the present invention.

Step for Adjusting the Particle Size

In the present invention, the starting clay is adjusted for its particle sizes so that the volume-based median diameter ($D_{50}$) thereof lies from 1 to 10 $\mu$m and, particularly, from 1 to 5 $\mu$m as measured by a laser diffraction method.

The particle size can be adjusted by subjecting the dioctahedral smectite clay mineral to the hydraulic elutriation, air elutriation or to any other classification operation, or by subjecting it to the milling operation.

In order to enhance the efficiency for using the starting clay, in general, the particle sizes are adjusted by the dry milling or wet milling. The milling is executed by using a finely pulverizing mill such as ball mill, tube mill or the like.

It is generally desired to adjust the particle size by wet-milling the starting clay in the form of an aqueous slurry having a solid component concentration of from 5 to 25% by weight.

The milling may be executed in a single stage or in many stages. A classification operation may be executed in combination after the milling operation or during the milling operation.

Mixing Step

In the present invention, an acid-soluble or acid-decomposing inorganic compound is mixed into the starting mineral of which the particle size is adjusted.

As the acid-soluble or acid-decomposing inorganic compound, there can be used alkaline earth metals such as calcium and magnesium, oxides such as of zinc or aluminum, hydroxides, carbonates, bicarbonates, and those metals such as aluminum, iron or the like that are soluble in acid or that decompose in acid.

When, for example, calcium carbonate is used among them, a carbonic acid gas is generated due to decomposition with acid contributing to increasing macropores in the activated clay.

When calcium carbonate is used as the acid-decomposing compound, a further advantage is obtained in addition to the above advantage. That is, when the starting clay granules containing calcium carbonate is treated with acid, carbonic acid gas is generated and, at the same time, gypsum is formed. Gypsum exists in the macropores of the activated regular-shaped clay particles and works to prevent contraction when the activated regular-shaped clay particles are dried after they are treated with the acid.

Besides, calcium carbonate is insoluble in water and can be contained in the mixture in the form of particles, offering an advantage that the mixture of the starting clay and the acid-decomposing compound can be prepared by wet-mixing.

It is, thus, particularly recommended to use calcium carbonate from the standpoint of producing activated regular-shaped clay particles containing macropores in a table form.

It is desired that the acid-soluble or acid-decomposing inorganic compound has a particle diameter ($D_{50}$) of, generally, from 0.1 to 5 $\mu$m and, particularly, from 0.1 to 2 $\mu$m from the standpoint of producing regular particles containing macropores.

The amount of the acid-soluble or acid-decomposing inorganic compound to be mixed varies depending upon its kind, but is, generally, from 1 to 15% by weight and, particularly, from 3 to 6% by weight in terms of the dry product of the starting material. When this amount is smaller than the above range, the size of the macropores fails to increase to a sufficient degree. When this amount exceeds the above range, on the other hand, the particles lose the strength. The mixing is conducted in a manner that the two are homogeneously mixed together using, generally, a stirrer for 30 to 60 minutes.

Granulating Step

According to the present invention, the thus obtained mixture is so granulated as to form regular particles having a volume-based median diameter ($D_{50}$) of from 10 to 60 μm and, particularly, from 10 to 45 μm as found by a laser diffraction method.

There is no particular limitation on the granulation means so far as the granules having the above-mentioned particle sizes are obtained. Particularly preferably, however, there can be employed a method of spray-dry granulating an aqueous slurry of the mixture. The spray-dry granulation method offers such an advantage that regular particles are obtained having a spherical shape or a shape close to the spherical shape, enabling the particle diameter to be adjusted to lie within the above-mentioned range.

The spray-dry granulation is generally conducted by using an aqueous slurry having a solid component concentration of from 3 to 10% by weight, atomizing and spraying the aqueous slurry into a dry atmosphere through two-fluid nozzles to effect the granulation and drying. The temperature of the dry atmosphere is suitably from about 80 to about 500° C., and the water content in the formed particles is suitably not larger than 15% by weight.

Treatment with an Acid

The treatment with an acid is conducted in a state where the granulated regular particles are maintaining their particle shape.

The treatment with the acid is conducted by filling a treatment vessel with the granules of the above mixture and bringing them into contact with an acidic aqueous solution. As the acidic aqueous solution, there can be used mineral acids such as sulfuric acid, hydrochloric acid or the like acid and, particularly, sulfuric acid at a concentration of suitably from about 20 to about 35% by weight. The treatment temperature is selected from a range of from 60 to 100° C. and the treating time is selected from a range of 3 to 20 hours so as to satisfy the above-mentioned requirements in relation to the activated clay.

In general, the treatment with the acid is conducted, preferably, by throwing granules into an aqueous solution containing a mineral acid maintained at a temperature of from 60 to 100° C. and, preferably, from 70 to 95° C. from the standpoint of maintaining the properties of the activated regular-shaped clay particles to lie within ranges specified by the present invention.

The mother liquor after the treatment with the acid contains basic components such as alumina, magnesium, calcium, iron and the like. Therefore, the mother liquor is used as an inorganic liquid coagulating agent or as a starting material for gypsum.

The acid-treated product after the mother liquor is recovered is washed with water, is dried and is, if necessary, classified to obtain the activated regular-shaped clay particles as a finished product. In the present invention, it is desired that the water-soluble salts contained in the acid-treated product are removed such that the amount of the acid radicals of the acid that is used is not larger than 3% by weight and, particularly, not larger than 1% by weight. This is because, the water-soluble salts contained in the acid-treated product adversely affect the quality of the product despite their amounts are very small.

The obtained acid-treated product can, if necessary, be dried or fired. Upon conducting the drying or firing, it is considered that the concentration of the silanol groups decreases on the surface of the activated clay creating a structure that swells little in water. It is desired that the drying or firing is conducted generally at from 80 to 500° C. and, particularly, from 100 to 300° C. for from 0.5 to 10 hours and, particularly, from 0.7 to 5 hours.

Activated Regular-Shaped Clay Particles and their Use

The activated regular-shaped clay particles of the invention have features as described above.

Described below is a representative chemical composition of the activated clay, though the composition is in no way limited thereto only.

| | |
|---|---|
| $SiO_2$ | 76.6% by weight |
| $Al_2O_3$ | 10.4% by weight |
| $Fe_2O_3$ | 2.4% by weight |
| MgO | 2.5% by weight |
| CaO | 0.5% by weight |
| ignition loss | 6.5% by weight |

The activated clay of the invention exhibits an X-ray diffraction peak of spacing at 17 to 19 angstroms as measured in a state of being treated with an ethylene glycol.

Figure 8:
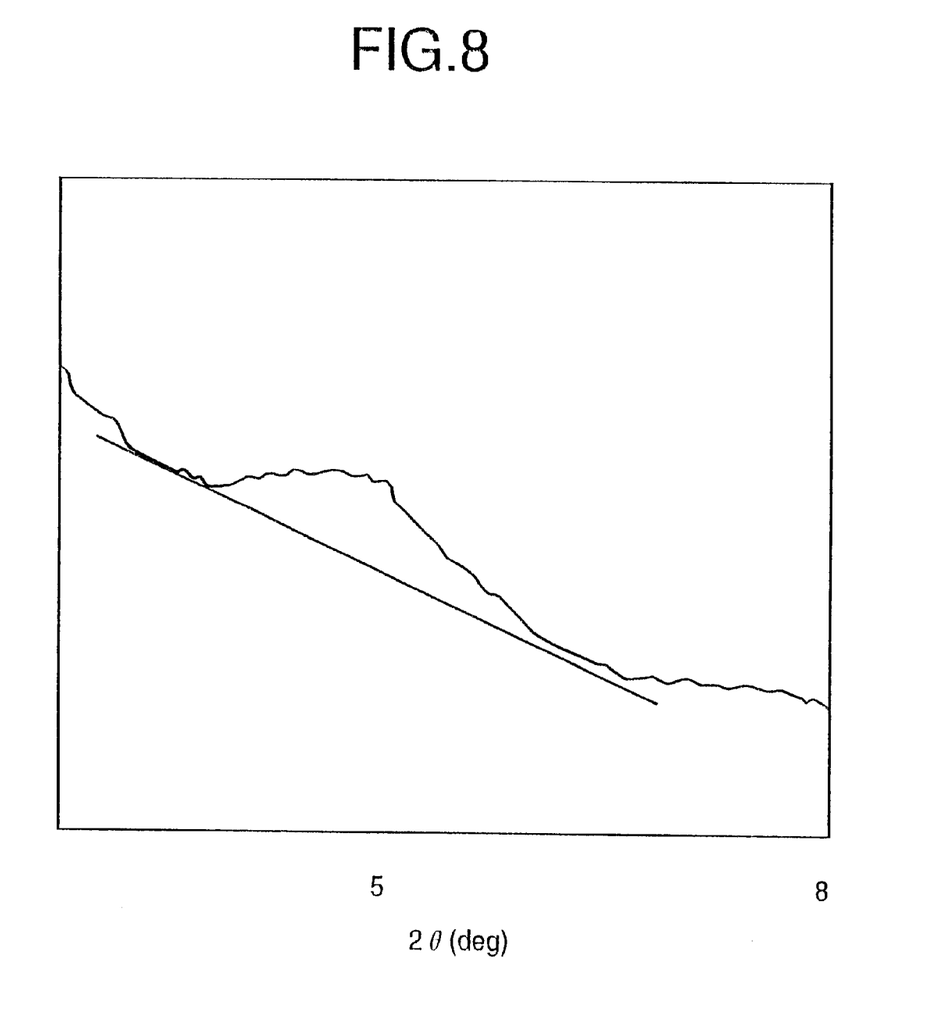
FIG. 8 is an X-ray diffraction image of the activated regular-shaped clay particles of the present invention that have been treated with an ethylene glycol.

FIG. 8 is an x-ray diffraction image of the activated clay of the present invention as measured in a state of being treated with the ethylene glycol. The treatment with the ethylene glycol is to bring the spacing of base plane reflection of an index of a plane (001) to lie within a predetermined range. It will be obvious that the activated clay of the present invention is not basically losing the layer structure of the dioctahedral smectite clay minerals.

As a further property, the activated clay of the present invention has a cation exchange capacity of from 30 to 55 meq/100 g.

The activated clay of the invention is effective as a refining agent for fats and oils or for mineral oils and, particularly, as a decolorizing agent or a deacidifying agent for fats or oils or for mineral oils.

Fats or oils to be refined may be at least one of plant fats or oils, animal fats and oils, and mineral oils.

Fats or oils which are starting materials ubiquitously exist in the natural world of animals and plants, and comprise, as a chief component, ester of fatty acid and glycerin, as exemplified by such plant oils or fats as safflower oil, soybean oil, rape oil, palm oil, palm kernel oil, safflower oil, cotton seed oil, coconut oil, rice bran oil, sesame oil, castor oil, linseed oil, olive oil, tung oil, tsubaki oil, peanut oil, kapok oil, cocoa oil, Japan wax, sunflower oil and corn oil, fish oils such as sardine oil, herring oil, cuttlefish oil, saury oil, and animal oils or fats such as liver oil, whale oil, beef fat, buttermilk fat, horse oil, pig fat and sheep fat, which may be used alone or in combination.

As the mineral oil, there can be exemplified a variety of lubricating oils such as spindle oil, refrigerator oil, dynamo oil, turbine oil, machine oil, lubricant for marine internal combustion engines for ships, lubricant for gasoline engines, lubricant for diesel engines, cylinder oil, marine engine oil, gear oil, cutting oil, insulating oil, automatic transmission oil, compressor oil, hydraulic operation oil, rolling oil and the like oils.

In conducting the refining, the activated clay is added in its powdery state, as a decolorizing agent or a refining agent, to fats or oils or mineral oils that are to be decolored or refined, and are homogeneously stirred together, so that coloring components and impurities contained in the fats or oils or in the mineral oils are adsorbed by the clay particles.

The activated regular-shaped clay of the present invention exhibits excellent property for adsorbing coloring matters and impurities and further exhibits excellent filtering property in separating them from the refined fats or oils.

Fats or oils or mineral oils are decolored under known conditions. For example, a decolorizing or refining agent is added in an amount of not larger than 5% by weight with respect to the fats and oils or mineral oils, and the two compositions are stirred at 50 to 250° C. for 5 to 30 minutes to complete the decolorizing and refining treatment.

The mixture after the decolorizing or refining treatment is supplied to any reduced-pressure or elevated-pressure filter, such as filter press, belt filter, olva filter, American filter or centrifugal filter, so as to be separated into refined fats or oils or mineral oils and the used decolorizing agent or refining agent which is the so-called waste clay. The decolorizing agent of the invention makes it possible to decrease the amount of the waste clay.

The activated regular-shaped clay particles of the present invention can be further used as a catalyst or a catalyst carrier.

That is, the activated regular-shaped clay particles exhibit the activity as a solid acid yet having macropores, and diffuse at an increased rate into the active sites, exhibit a higher activity than the conventional activated clay, and can be used as a catalyst for dehydration, decomposition, polymerization and isomerization.

The activated regular-shaped clay particles can be further used as a catalyst carrier to carry widely known catalytic metal components such as Ti, Zr, V, Cr, Mo, W, Mn, Co, Ni, Pd, Pt and Cu so as to be used as a catalyst.

EXAMPLES

Examples of the invention will now be described. Measurements were taken according to the following methods.
(1) Measurement of Average Particle Diameter.

The average particle diameter (median diameter: $\mu$m) was measured by using a laser diffraction-type particle size analyzer (Mastersizer S) produced by Malbarn Co.
(2) BET Specific Surface Area.

Measured in compliance with the BET method by using Sorptomatic Series 1900 manufactured by Carlo Erba Co.
(3) Porous Volume.

The porous volume was measured based on the mercury intrusion porosity method by using Autopore 9220 produced by Micromellitics Co.
(4) Scanning-type Electron Microphotograph (SEM).

The scanning-type electron microphotograph was taken by using a scanning-type electron microscope S-570 manufactured by Hitachi, Ltd.
(5) Circularity.

A typical particle was selected from a photograph obtained by using the scanning-type electron microscope (S-570 manufactured by Hitachi, Ltd.), and the circularity was found from the following formula (1), $$A = \{\sqrt{(R_1 \times R_2)}\}/R_1 \quad (1)$$

wherein $R_1$ represents the radius of a circumscribed circle along the contour of a particle of a scanning-type electron microphotograph thereof, and $R_2$ represents the radius of an inscribed circle thereof.

(6) X-ray Diffraction.

Measured for Cu-κα under the following conditions by using a Geiger-Flex RAD-1B system manufactured by Rigaku Denki Co.

| | |
|---|---|
| Target | Cu |
| Filter | Ni |
| Tube voltage | 35 kV |
| Tube current | 15 mA |
| Scanning speed | 2 deg/min |
| Time constant | 1 sec |
| Slit | DS(SS) 1 deg RS 0.3 mm |

(7) X-ray Diffraction of a Sample Treated with Ethylene Glycol.

The sample dried at 110° C. for 2 hours was picked up in an amount of 1.0 g and to which was added 5 ml of a 10% ethylene glycol aqueous solution using a whole pipette. The mixture was stirred well with a stirrer rod and dried at 60° C. for 12 hours. The dry product was smashed in an agate mortar, and the obtained powder was measured for its X-ray diffraction under the following conditions.

| | |
|---|---|
| Target | Cu |
| Filter | Ni |
| Tube voltage | 40 kV |
| Tube current | 20 mA |
| Scanning speed | 1 deg/min |
| Time constant | 2 sec |
| Slit | DS(SS) 1/2 deg RS 0.3 mm |

(8) Amount of Solid Acid.

Measured in compliance with the n-butylamine measuring method [reference literature: "CATALYST", Vol. 11, No. 6, pp. 210–216, 1969].
(9) Packing Density.

Measured based on the iron cylinder method in compliance with JIS K 6220.
(10) Chemical Composition.

Ignition loss (Ig-loss), silicon dioxide ($SiO_2$), aluminum oxide ($Al_2O_3$), iron oxide ($Fe_2O_3$), calcium oxide (CaO) and magnesium oxide (MgO) were analyzed in compliance with JIS M 8855. $Na_2O$ and $K_2O$ were measured based on the atomic absorption method. The standard sample to be measured was obtained by drying 1 g of the sample at 110° C. for 3 hours.
(11) pH.

A pH value of a 5% suspension measured in compliance with JIS K 5101.26.
(12) Decolorizing Testing Method and Chlorophyll Residue Concentration.

Figure 9:
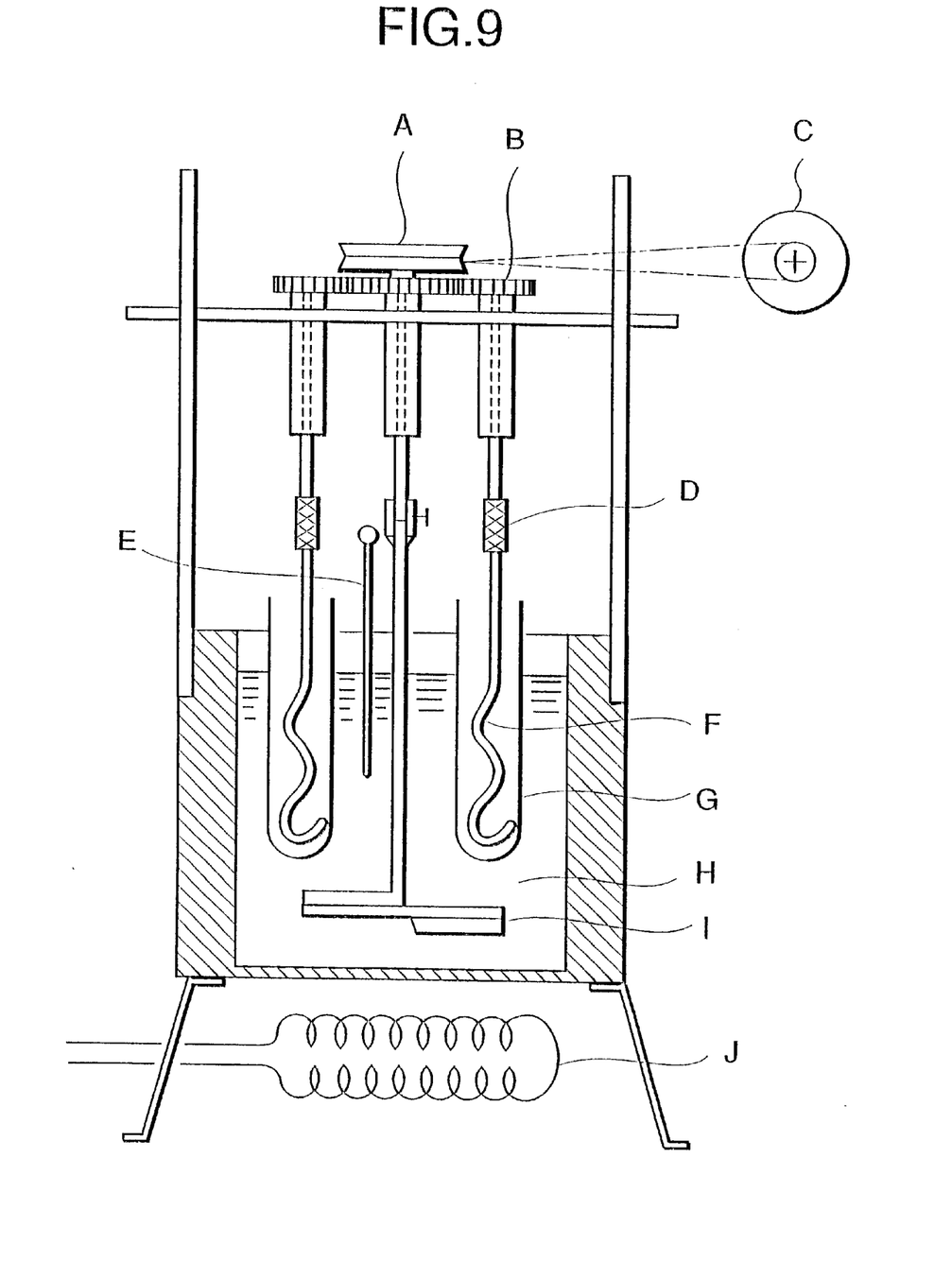
FIG. 9 is a sectional view of a decolorizing tester.

A decolorizing tester shown in FIG. 9 was used for testing the performance of the adsorbing agent for decolorizing. For details, reference should be made to Chemistry and Industry 4, 125, (1951). The decolorizing tester permits eight hard-glass large testing tubes (content of 200 ml) to be set in an oil bath. A corrugated stirrer rod having a rounded lower end is introduced into each test tube, and its lower end is so adjusted by a rubber tube as to come in contact with the bottom of the test tube at all times. The eight stirrer rods are rotated by pinions divided from a central master gear and are, hence, rotated quite at an equal speed.

Stirrer vanes are attached to the lower part of the central master gear to stirrer the oil bath to maintain the temperature uniform in the oil bath. The decolorizing tester is capable of testing any number of samples up to a maximum of eight samples.

The rape oil after deacidified is put in an amount of 50 g into each of the test tubes, and the sample adsorbing agent is added in amount of 0.5 g (1% with respect to the oil) to each of them, and is mixed well with the stirrer rods for decolorizing testing. The test tubes are set to the decolorizing tester maintained at 110° C., stirred for 20 minutes, taken out from the decolorizing tester, and the mixture slurries of the oil and the adsorbing agent are filtered to obtain the decolorized oils.

Decolorizing Testing

White light-beam transmission factors (relative values with the transmission factor of the distilled water as 100%) of the decolorized oils were measured by using a photoelectric calorimeter, Model 2C, manufactured by Hirama Rika-Kenkyujo Co., and the thus measured values were used as decolorizing abilities of the adsorbing agents. The larger the values of transmission factors, the larger the decolorizing ability of the adsorbing agents.

Chlorophyll Residue Concentration

The chlorophyll concentrations in the decolorized oils were measured at a wavelength of λ=670 nm relying on the absorption spectra.

(13) Filtering Testing.

The deacidified soybean oil is put in an amount of 50 g into a 100-ml beaker, heated at 95° C. with stirring on a heating-type magnetic stirrer and, then, 5 g of the sample adsorbing agent (10% relative to the oil) is added thereto followed by stirring for 15 minutes. Thereafter, the mixture slurry of the oil and the adsorbing agent is filtered at a temperature of 95° C. under a reduced pressure of 300 mmHg. The time from when the mixture slurry of the oil and the adsorbing agent is poured into a funnel until when the whole surface of the filtered cake appears, is regarded to be a filtering rate.

Example 1

A dioctahedral smectite clay mineral shown in Table 1 was used as a starting material. By using 500 g of this starting material (40% of water content), a slurry was prepared having a solid component concentration of 20% by weight, and was wet-milled by using a pot mill. After the impurities were removed by a sieve, the slurry was wet-milled by using a continuous finely-granulating wet-type pulverizer so as to assume a volume-based median diameter ($D_{50}$) of 5 μm. To 1000 g of the thus pulverized slurry was added 131 g of a slurry containing calcium carbonate at a solid component concentration of 8% by weight (5% by weight in terms of the dry product), and the mixture was stirred using a stirrer for 30 minutes. The mixed slurry was spray-dried to obtain granules (average particle diameter of 35 μm). The obtained granules were treated with sulfuric acid of a concentration of 35%, and were washed with water and were dried followed by sieving with a sieve of 150 mesh to obtain activated regular-shaped clay particles. The obtained activated regular-shaped clay particles were measured for their physical properties. The results were as shown in Table 1. FIG. 1(A) is its SEM photograph. The circularity (A) was 0.94. The decolorizing testing and filtering testing exhibited favorable results as shown in Table 3.

Example 2

A dioctahedral smectite clay mineral shown in Table 1 was used as a starting material. By using 500 g of this starting material (40% of water content), a slurry was prepared having a solid component concentration of 20% by weight, and was wet-milled by using a pot mill. After the impurities were removed by a sieve, the slurry was wet-milled by using a continuous finely-granulating wet-type pulverizer so as to assume a volume-based median diameter ($D_{50}$) of 2 Mm. To 1000 g of the thus pulverized slurry was added 131 g of a slurry containing calcium carbonate at a solid component concentration of 8% by weight (5% by weight in terms of the dry product), and the mixture was stirred using a homomixer at 600 rpm for 60 minutes. The mixed slurry was spray-dried to obtain granules (average particle diameter of 39.1 μm). The obtained granules were treated with sulfuric acid of a concentration of 35%, and were washed with water and were dried followed by sieving with a sieve of 150 mesh to obtain activated-shaped regular clay particles. The obtained activated regular-shaped clay particles were measured for their physical properties. The results were as shown in Table 1. The decolorizing testing and filtering testing exhibited favorable results as shown in Table 3. FIG. 1(B) is its SEM photograph. The circularity (A) was 0.91.

Example 3

The procedure was carried out in the same manner as in Example 1 with the exception of using magnesium carbonate instead of calcium carbonate to obtain the activated regular clay particles. The obtained activated regular-shaped clay particles were measured for their physical properties. The results were as shown in Table 1. The decolorizing testing and filtering testing exhibited favorable results as shown in Table 3.

Example 4

The procedure was carried out in the same manner as in Example 2 with the exception of using slaked lime (calcium hydroxide) instead of calcium carbonate to obtain the activated regular-shaped clay particles. The obtained activated regular-shaped clay particles were measured for their physical properties. The results were as shown in Table 1. The decolorizing testing and filtering testing exhibited favorable results as shown in Table 3.

Example 5

The procedure was carried out in the same manner as in Example 2 with the exception of changing the amount of the slurry containing 8% by weight of calcium carbonate into 441 g (15% by weight in terms of the dry product) to obtain the activated regular-shaped clay particles. The obtained activated regular-shaped clay particles were measured for their physical properties. The results were as shown in Table 1. The decolorizing testing and filtering testing exhibited favorable results as shown in Table 3.

Comparative Example 1

A dioctahedral smectite clay mineral shown in Table 2 was used as a starting material. By using 500 g of this starting material (40% of water content), a slurry was prepared having a solid component concentration of 20% by weight, and was wet-milled by using a pot mill. After the impurities were removed by a sieve, the slurry was wet-milled by using a continuous finely-granulating wet-type pulverizer so as to assume a volume-based median diameter ($D_{50}$) of 2 μm. The slurry was spray-dried to obtain granules.

The obtained granules were treated with sulfuric acid of a concentration of 35%, and were washed with water and were dried followed by sieving with a sieve of 150 mesh to obtain activated regular-shaped clay particles. The obtained activated regular-shaped clay particles were measured for their physical properties. The results were as shown in Table 2. FIG. 3 shows the results of the decolorizing testing and filtering testing.

Comparative Example 2

The procedure was carried out in the same manner as in Example 2 with the exception of changing the amount of the slurry containing 8% by weight of calcium carbonate into 625 g (20% by weight in terms of the dry product) to obtain the activated regular clay particles. The obtained activated regular-shaped clay particles were measured for their physical properties. The results were as shown in Table 2. Table 3 shows the results of the decolorizing testing and filtering testing.

Comparative Examples 3 to 5

Commercially available activated clays of compositions shown in Table 2 were used. The activated clays were measured for their physical properties. The results were as shown in Table 2. Table 3 shows the results of the decolorizing testing and filtering testing.

TABLE 1

| | Example 1 | Example 2 | Example 3 | Example 4 | Example 5 |
|---|---|---|---|---|---|
| Starting clay Chemical composition (%) | | | | | |
| Ig-Loss | 5.1 | ← | ← | ← | ← |
| $SiO_2$ | 70.3 | ← | ← | ← | ← |
| $Al_2O_3$ | 13.9 | ← | ← | ← | ← |
| $Fe_2O_3$ | 2.5 | ← | ← | ← | ← |
| CaO | 0.8 | ← | ← | ← | ← |
| MgO | 4.5 | ← | ← | ← | ← |
| $Na_2O$ | 1.6 | ← | ← | ← | ← |
| $K_2O$ | 0.6 | ← | ← | ← | ← |
| Total | 99.3 | ← | ← | ← | ← |
| Activated clay Chemical composition (%) | | | | | |
| Ig-Loss | 6.1 | 6.2 | 6.0 | 6.2 | 6.1 |
| $SiO_2$ | 81.3 | 81.3 | 81.4 | 81.1 | 81.0 |
| $Al_2O_3$ | 6.7 | 6.7 | 6.7 | 6.6 | 6.5 |
| $Fe_2O_3$ | 0.8 | 0.8 | 0.8 | 0.7 | 0.8 |
| CaO | 2.0 | 2.0 | 0.6 | 2.3 | 2.6 |
| MgO | 1.0 | 1.0 | 2.5 | 1.0 | 1.1 |
| $Na_2O$ | 0.4 | 0.4 | 0.5 | 0.4 | 0.4 |
| $K_2O$ | 0.4 | 0.4 | 0.6 | 0.3 | 0.5 |
| Total | 98.7 | 98.9 | 99.1 | 98.6 | 98.0 |
| 5% usp.pH | 2.4 | 2.7 | 2.7 | 3.0 | 2.9 |
| Average particle diameter (μm) | 35.0 | 39.1 | 35.7 | 28.5 | 14.5 |
| Packing density (g/ml) | 0.46 | 0.44 | 0.46 | 0.45 | 0.47 |
| Specific surface area (m²/g) | 338 | 332 | 335 | 326 | 344 |
| Porous volume (cc/g)1000~70000 Å | 0.66 | 0.74 | 0.67 | 0.72 | 0.68 |
| Amount of solid acid (mmol/g) | | | | | |
| $H_0 \leq -5.6$ | 0.41 | 0.45 | 0.48 | 0.40 | 0.39 |
| $-5.6 \leq H_0 \leq -3.0$ | 0.03 | 0.04 | 0.03 | 0.03 | 0.03 |
| $-3.0 \leq H_0 \leq +1.5$ | 0.02 | 0.02 | 0.02 | 0.03 | 0.02 |

TABLE 1-continued

| | Example 1 | Example 2 | Example 3 | Example 4 | Example 5 |
|---|---|---|---|---|---|
| $+1.5 \leq H_0 \leq +3.3$ | 0.02 | 0.04 | 0.03 | 0.02 | 0.03 |
| $+3.3 \leq H_0 \leq +4.8$ | 0.47 | 0.46 | 0.45 | 0.46 | 0.43 |

TABLE 2

| | Comp. Ex. 1 | Comp. Ex. 2 | Comp. Ex. 3(A)* | Comp. Ex. 4(B)* | Comp. Ex. 5(C)* |
|---|---|---|---|---|---|
| Starting clay Chemical composition (%) | | | | | |
| Ig-Loss | 5.1 | ← | | | |
| $SiO_2$ | 70.3 | ← | | | |
| $Al_2O_3$ | 13.9 | ← | | | |
| $Fe_2O_3$ | 2.5 | ← | | | |
| CaO | 0.8 | ← | | | |
| MgO | 4.5 | ← | | | |
| $Na_2O$ | 1.6 | ← | | | |
| $K_2O$ | 0.6 | ← | | | |
| Total | 99.3 | ← | | | |
| Activated clay Chemical composition (%) | | | | | |
| Ig-Loss | 6.3 | 6.0 | 5.0 | 10.6 | 5.2 |
| $SiO_2$ | 82.5 | 81.0 | 84.2 | 70.8 | 81.0 |
| $Al_2O_3$ | 6.9 | 6.7 | 6.5 | 7.6 | 7.9 |
| $Fe_2O_3$ | 0.5 | 0.7 | 0.9 | 4.7 | 1.9 |
| CaO | 0.6 | 2.9 | 0.4 | 1.9 | 0.8 |
| MgO | 0.7 | 0.8 | 1.3 | 1.3 | 2.2 |
| $Na_2O$ | 0.6 | 0.4 | 0.3 | 0.4 | 0.5 |
| $K_2O$ | 0.9 | 0.3 | 0.9 | 0.8 | 0.4 |
| Total | 99.0 | 98.8 | 99.5 | 98.1 | 98.9 |
| 5% usp.pH | 2.7 | 2.8 | 3.0 | 2.6 | 3.3 |
| Average particle diameter (μm) | 34.5 | 12.9 | 22.1 | 32.3 | 27.9 |
| Packing density (g/ml) | 0.50 | 0.49 | 0.48 | 0.50 | 0.50 |
| Specific surface area (m²/g) | 303 | 338 | 321 | 305 | 300 |
| Porous volume (cc/g)1000~70000 Å | 0.34 | 0.60 | 0.62 | 0.56 | 0.44 |
| Amount of solid acid (mmol/g) | | | | | |
| $H_0 \leq -5.6$ | 0.39 | 0.36 | 0.35 | 0.49 | 0.42 |
| $-5.6 \leq H_0 \leq -3.0$ | 0.04 | 0.03 | 0.02 | 0.03 | 0.02 |
| $-3.0 \leq H_0 \leq +1.5$ | 0.02 | 0.02 | 0.02 | 0.03 | 0.03 |
| $+1.5 \leq H_0 \leq +3.3$ | 0.02 | 0.02 | 0.03 | 0.04 | 0.01 |
| $+3.3 \leq H_0 \leq +4.8$ | 0.44 | 0.40 | 0.41 | 0.45 | 0.40 |

*; commercial product

TABLE 3

| | Transmission factor (%) | Concentration of chlorophyll residue (ppm) | Filtering testing (min' sec.") |
|---|---|---|---|
| Example 1 | 58.3 | 0.23 | 2'55" |
| Example 2 | 62.1 | 0.20 | 1'25" |
| Example 3 | 57.7 | 0.33 | 2'34" |
| Example 4 | 61.3 | 0.29 | 1'40" |
| Example 5 | 61.8 | 0.27 | 5'20" |
| Comp.Ex. 1 | 46.2 | 0.94 | 1'17" |
| Comp.Ex. 2 | 57.5 | 0.43 | 11'48" |
| Comp.Ex. 3 | 61.0 | 0.31 | 17'15" |
| Comp.Ex. 4 | 58.0 | 0.42 | 10'3" |

TABLE 3-continued

|  | Transmission factor (%) | Concentration of chlorophyll residue (ppm) | Filtering testing (min' sec.") |
|---|---|---|---|
| Comp.Ex. 5 deacidified rape oil | 53.0 9.0 | 0.57 21.6 | 12'7" — |

Sample oil: deacidified rape oil
Amount of clay added: 1% by weight (relative to the sample oil)

Industrial Applicability

The present inventors have succeeded in producing activated regular-shaped clay particles forming macropores therein, preserving fine structure of the dioctahedral smectite clay minerals, and having particle diameters controlled to lie within a range in which they exhibit excellent filtering property. The activated regular-shaped clay particles exhibit excellent adsorbing property and filtering property in combination.

The invention further makes it possible to easily and efficiently produce the activated regular-shaped clay particles having the above-mentioned properties without using any particular apparatus or means.

What is claimed is:

1. Activated regular clay particles comprising acid-treated dioctahedral smectite clay minerals, wherein the regular particles have a volume-based median diameter ($D_{50}$) of from 10 to 60 μm as found by a laser diffraction method, have a porous volume in pores having radii of 1000 to 70,000 angstroms of from 0.63 to 1.00 cc/g as measured by a mercury intrusion porosity method, and have a BET specific surface area of from 250 to 400 m$^2$/g.

2. Activated regular clay particles according to claim 1, wherein the activated regular clay particles have a circularity (A) defined by the following formula (1), $$A=\{\sqrt{(R_1 \times R_2)}\}/R_1 \quad (1)$$

wherein $R_1$ represents the radius of a circumscribed circle along the contour of a particle of a scanning electron microphotograph thereof, and $R_2$ represents the radius of an inscribed circle thereof, of from 0.8 to 1.0.

3. Activated regular clay particles according to claim 2, wherein the activated regular clay particles have a curved thin-piece texture specific to montmorillonite and porous texture in the scanning electron microphotograph thereof.

4. Activated regular clay particles according to claim 3, wherein the activated regular clay particles have a diffraction peak at 2Θ=19 to 20 degrees specific to montmorillonite and a diffraction peak at 2Θ=25 to 26 degrees specific to gypsum in the X-ray diffraction (Cu-Κα).

5. A refining agent for fats or oils, comprising the activated clay of claim 4.

6. A catalyst carrier comprising the activated clay of claim 4.

7. A refining agent for fats or oils, comprising the activated clay of claim 3.

8. A catalyst carrier comprising the activated clay of claim 3.

9. Activated regular clay particles according to claim 2, wherein the activated regular clay particles have a diffraction peak at 2Θ=19 to 20 degrees specific to montmorillonite and a diffraction peak at 2Θ=25 to 26 degrees specific to gypsum in the X-ray diffraction (Cu-Κα).

10. A refining agent for fats or oils, comprising the activated clay of claim 9.

11. A catalyst carrier comprising the activated clay of claim 9.

12. A refining agent for fats or oils, comprising the activated clay of claim 2.

13. A catalyst carrier comprising the activated clay of claim 2.

14. Activated regular clay particles according to claim 1, wherein the activated regular clay particles have a curved thin-piece texture specific to montmorillonite and porous texture in the scanning electron microphotograph thereof.

15. Activated regular clay particles according to claim 14, wherein the activated regular clay particles have a diffraction peak at 2Θ=19 to 20 degrees specific to montmorillonite and a diffraction peak at 2Θ=25 to 26 degrees specific to gypsum in the X-ray diffraction (Cu-Κα).

16. A refining agent for fats or oils, comprising the activated clay of claim 15.

17. A refining agent for fats or oils, comprising the activated clay of claim 14.

18. A catalyst carrier comprising the activated clay of claim 14.

19. Activated regular clay particles according to claim 1, wherein the activated regular clay particles have a diffraction peak at 2Θ=19 to 20 degrees specific to montmorillonite and a diffraction peak at 2Θ=25 to 26 degrees specific to gypsum in the X-ray diffraction (Cu-Κα).

20. A refining agent for fats or oils, comprising the activated clay of claim 19.

21. A catalyst carrier comprising the activated clay of claim 19.

22. A catalyst carrier comprising the activated clay of claim 15.

23. A refining agent for fats or oils, comprising the activated clay of claim 1.

24. A catalyst carrier comprising the activated clay of claim 1.

25. A method of producing activated regular clay particles comprising the steps of:
adjusting the particle size of dioctahedral smectite clay minerals to possess a volume-based median diameter ($D_{50}$) of from 1 to 10 μm as found by a laser diffraction method;
mixing an acid-soluble or acid-decomposing inorganic compound with the product thereof;
granulating the mixture into regular particles having a volume-based median diameter ($D_{50}$) of from 10 to 60 μm as found by a laser diffraction method; and
treating the regular particles with an acid while maintaining the particle shapes.

26. A method of production according to claim 5, wherein an acid-soluble or acid-decomposing inorganic compound is mixed with the product in an amount of from 1 to 15% by weight in terms of the dry product thereof.

27. A method of production according to claim 26, wherein the acid-decomposing inorganic compound is calcium carbonate.

28. A method of production according to claim 27, wherein the mixture is granulated by subjecting a slurry of the mixture to a spray dry granulation.

29. A method of production according to claim 28, wherein the regular particles are treated with an acid by immersing the particles in an aqueous solution of a mineral acid maintained at 60 to 100° C.

30. A method of production according to claim 27, wherein the regular particles are treated with an acid by immersing the particles in an aqueous solution of a mineral acid maintained at 60 to 100° C.

31. A method of production according to claim 26, wherein the mixture is granulated by subjecting a slurry of the mixture to a spray dry granulation.

32. A method of production according to claim 31, wherein the regular particles are treated with an acid by immersing the particles in an aqueous solution of a mineral acid maintained at 60 to 100° C.

33. A method of production according to claim 26, wherein the regular particles are treated with an acid by immersing the particles in an aqueous solution of a mineral acid maintained at 60 to 100° C.

34. A method of production according to claim 25, wherein the mixture is granulated by subjecting a slurry of the mixture to a spray-dry granulation.

35. A method of production according to claim 34, wherein the regular particles are treated with an acid by immersing the particles in an aqueous solution of a mineral acid maintained at 60 to 100° C.

36. A method of production according to claim 26, wherein the regular particles are treated with an acid by immersing the particles in an aqueous solution of a mineral acid maintained at 60 to 100° C.

* * * * *